United States Patent
Krishnaswamy et al.

(10) Patent No.: US 7,647,597 B2
(45) Date of Patent: *Jan. 12, 2010

(54) TRANSPARENT AND SUB-CLASSABLE PROXIES

(75) Inventors: Raja Krishnaswamy, Redmond, WA (US); Tarun Anand, Bellevue, WA (US); Christopher W. Brumme, Mercer Island, WA (US); Gopala Krishna R. Kakivaya, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 428 days.

This patent is subject to a terminal disclaimer.

(21) Appl. No.: 11/180,335

(22) Filed: Jul. 13, 2005

(65) Prior Publication Data

US 2005/0268309 A1 Dec. 1, 2005

Related U.S. Application Data

(63) Continuation of application No. 09/893,829, filed on Jun. 28, 2001.

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/319; 719/315; 719/320; 709/245

(58) Field of Classification Search .......... 719/315, 719/319, 320; 709/245, 246
See application file for complete search history.

(56) References Cited

U.S. PATENT DOCUMENTS

| | | | |
|---|---|---|---|
| 5,613,148 | A | 3/1997 | Bezviner et al. |
| 5,724,588 | A | 3/1998 | Hill et al. |
| 5,732,270 | A | 3/1998 | Foody et al. |
| 5,754,854 | A | 5/1998 | Kanamori et al. |
| 5,903,725 | A | 5/1999 | Colyer |
| 6,108,715 | A | 8/2000 | Leach et al. |
| 6,125,366 | A | 9/2000 | Bernstein et al. |
| 6,182,155 | B1 | 1/2001 | Cheng et al. |
| 6,199,095 | B1 | 3/2001 | Robinson |
| 6,230,160 | B1 | 5/2001 | Chan et al. |
| 6,253,253 | B1 | 6/2001 | Mason et al. |
| 6,263,491 | B1 | 7/2001 | Hunt |
| 6,282,581 | B1 | 8/2001 | Moore et al. |
| 6,324,543 | B1 | 11/2001 | Cohen et al. |

(Continued)

OTHER PUBLICATIONS

Orfali, Robert; Harkey, Dan; and Edwards, Jeri. The Essential Distributed Object Survival Guide. New York, NY: John Wiley & Sons, Inc., 1996.*

(Continued)

*Primary Examiner*—Diem Ky Cao
(74) *Attorney, Agent, or Firm*—Workman Nydegger

(57) ABSTRACT

A system and method for interacting with an object is provided. The system includes a method call interceptor that intercepts a method call made on an object and that routes the method call to a proxy. The method call interceptor is accessible to application code. The system also includes an application code generic proxy that after overriding a base class invocation method can receive intercepted method calls, can invoke methods on the object that the proxy images, can receive results from the object that the proxy images and can pass results to the entity that generated the intercepted method call.

17 Claims, 13 Drawing Sheets

U.S. PATENT DOCUMENTS

| | | | |
|---|---|---|---|
| 6,381,735 | B1 | 4/2002 | Hunt |
| 6,385,661 | B1 | 5/2002 | Guthrie et al. |
| 6,393,497 | B1 | 5/2002 | Arnold et al. |
| 6,466,947 | B2 * | 10/2002 | Arnold et al. ............ 707/104.1 |
| 6,487,714 | B1 | 11/2002 | Azagury et al. |
| 6,567,861 | B1 | 5/2003 | Kasichainula et al. |
| 6,725,214 | B2 * | 4/2004 | Garcia-Chiesa ................ 707/3 |
| 6,748,555 | B1 | 6/2004 | Teegan et al. |
| 6,823,460 | B1 | 11/2004 | Hollander et al. |
| 6,915,520 | B2 | 7/2005 | Sanchez, II |
| 6,941,561 | B1 | 9/2005 | Kasichainula et al. |
| 2001/0042058 | A1 | 11/2001 | Harrington et al. |
| 2002/0035642 | A1 | 3/2002 | Clarke et al. |
| 2002/0099723 | A1 * | 7/2002 | Garcia-Chiesa ............ 707/200 |
| 2007/0043574 | A1 * | 2/2007 | Coffman et al. ............ 704/275 |

OTHER PUBLICATIONS

Steflik, Dick and Sridharan, Prashant. Advanced Java Networking. Upper Saddle River, NJ: Prentice-Hall, Inc., 2000.*

Hicks et al, Transparent Communication for Distributed Objects in Java, ACM, 1999, pp. 160-170.*

Marchetti et al, CORBA request portable interceptors: a performance analysis, IEEE, 2001, pp. 208-217.*

Wang et al, The Design and Performance of Meta-Programming Mechanism for Object Request Broker Middleware, USENIX Conference, Jan./Feb. 2001, pp. 1-17.*

Massen, J., Van Nieuwpoort, R., Valdema, R., Bal, H. E., Plaat, A. "An Efficient Implementation or Java's Remote Method Invocation," Proceedings of the 7th ACM SIGPLAN Symposium (1999) pp. 173-182.

Hicks, M., Jagannathan, R. Kelsey, R., Moore. J. T., Ungureau, C. "Transparent Communication for Distributed Objects in Java" Proceedings of the ACM 1999 Cenference on Java Grande (1999) pp. 160-170.

OA Dated Jan. 23, 2009 for U.S. Appl. No. 09/893,829, 20 pages.

OA Dated Jul. 31, 2008 for U.S. Appl. No. 09/893,829, 17 pages.

* cited by examiner

PRIOR ART FIG. 1

TRANSPARENT AND SUB-CLASSABLE PROXIES

CROSS REFERENCE

This application is a continuation of copending U.S. application Ser. No. 09/893,829, filed Jun. 28, 2001, entitled TRANSPARENT AND SUB-CLASSABLE PROXIES, the disclosure of which is hereby incorporated by reference as if fully set forth herein.

TECHNICAL FIELD

The present invention generally relates to object systems, and more particularly to application developer coded extensible proxies that have access to method interception and remoting functionality and data.

BACKGROUND OF THE INVENTION

A proxy is an image of an object where the object resides in a different logical and/or physical entity (e.g., machine, process, network). Proxies may be employed in distributed systems (where the proxy is a local image of a remote object) and in non-distributed systems (where the proxy is a local image of a local object). In distributed systems, proxies can be employed to facilitate local processing that may improve efficiency and call forwarding while in non-distributed systems proxies can be employed to facilitate actions like auditing and persisting an object. Proxies employed in remote processing may interact with a remote object that may reside across a remoting boundary (e.g., machine, domain). Proxies employed in local processing may interact with a local object that does not reside across a remoting boundary but which may still reside across a logical boundary (e.g., address space, process). When a method call is made to the object imaged by the proxy, conventional systems intercept the call and route it to the proxy, which is then able to perform system defined functions like forwarding the call to the object where the method is performed. The object that is imaged by the proxy then returns results to the proxy, which receives the results and is then able to again perform system defined functions like passing the results to the method caller. Changing the behavior of the system defined functions conventionally requires rewriting system code, which can be time consuming, expensive and introduce bugs into systems, and thus such changes are infrequently made.

Intercepting a method call invoked on an object that is imaged by a proxy is typically performed by a system-level object system and thus is not accessible to application developers. Similarly, data associated with the system-level object system is conventionally not available to application developers. Furthermore, conventional system-level object systems do not allow application developers to create proxies and thus conventional systems are inflexible and difficult to extend and/or adapt to various user contexts and needs. Thus, improvements to such systems are infrequently made.

Therefore there remains a need for a system and method to increase the flexibility of object systems to facilitate extending and/or adapting such object systems to various user contexts and needs.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and method for interacting with an object where the system and method facilitate application developers creating proxies, accessing method call interception functionality, retrieving information associated with a method call that can be intercepted by the interception functionality and adapting and/or extending the functionality of object systems. Thus, object systems become more adaptable and/or extensible and inflexibility problems associated with conventional systems are mitigated.

The present invention facilitates application developers building proxies by providing one or more base classes that have access to intercepting and/or remoting functionality from which application developers can inherit. The base class proxy object can provide system level functions like remoting infrastructure functionality (e.g., message passing, sinks, message synchronization) and intercepting infrastructure functionality (e.g., call stack access, acquisition of process control) to an application developer. The base class proxy provides an interface to system level functions like call intercepting by providing one or more methods that can be overridden and which will invoked when the method call to be intercepted is invoked on the object imaged by the application code generic proxy. The interface facilitates not only receiving control when the method to be intercepted is invoked, but also facilitates receiving information concerning the method call. By way of illustration, intercepting a method call and making such interception accessible to an application developer can include receiving control and receiving a data structure and/or object populated with information concerning the intercepted method call. The information can include, but is not limited to, method call process identification data, class/interface defining method data, method name data, data concerning the number of input parameters, data concerning the type of input parameters, data concerning the value of input parameters, data concerning the number of expected return parameters, data concerning the type of expected return parameters, stack pointer data and heap pointer data, for example.

In accordance with an aspect of the present invention, a system for interacting with an object is provided. The system includes a method call interceptor that intercepts a method call to an object and routes the method call to a proxy. Unlike conventional systems, the method call interceptor is accessible to application code. The system also includes an application code generic proxy that can receive an intercepted method call, that can invoke the method on the object imaged by the proxy, that can receive results from the object imaged by the proxy and that can pass results to the entity that generated the intercepted method call. Unlike conventional systems, the proxy can be written by application developers. In one example of the present invention, the object is located across a remoting boundary, and thus, the data may be marshaled by reference and/or by value. In another example of the present invention, the method call interceptor populates a message object with information associated with the intercepted method call. The message object is accessible to application code and in one example of the present invention, the message object is populated with at least one of a method name, one or more input parameters, class/interface defining method data, a count of the number of input parameters, one or more type identifiers associated with the input parameters, a count of the number of return parameters for the method call, one or more type identifiers associated with the return parameters, a stack pointer and a heap pointer.

Another aspect of the present invention provides a computer readable medium containing computer executable components for a system for interacting with an object. The components include a method call intercepting component that intercepts a method call to an object and routes the method call to a proxy. The method call intercepting component is accessible to application code. The computer readable medium further contains an application code generic proxy component that can receive an intercepted method call, that can invoke a method on the object imaged by the proxy, that can receive results from the object imaged by the proxy and that can pass results to the entity that generated the intercepted method call.

Yet another aspect of the present invention provides a method for interacting with an object. The method includes employing application code to create a base class proxy object and creating an application code generic proxy, where the application code generic proxy inherits from the base class proxy object. The method further includes overriding a base class method in the application code generic proxy, where the overridden method will receive an intercepted method call, intercepting a method call on the object imaged by the proxy and routing the method call to the application code generic proxy. The application code generic proxy may then invoke a method on the object imaged by the proxy and may receive a return message from the object imaged by the proxy. The application code generic proxy may then return a result to the entity that generated the intercepted method call. In one example of the present invention, the method includes the application code generic proxy performing pre-processing before invoking the method on the object imaged by the proxy, where the pre-processing may include actions like load-balancing, transaction processing, object migration and/or object persisting. In yet another example of the present invention, the method includes the application code generic proxy performing proxy post-processing before returning the result to the entity that generated the intercepted method call, where the post-processing includes actions like auditing, transaction processing, object migration and/or object persisting.

Another aspect of the present invention provides a computer readable medium containing computer executable instructions for performing a method for interacting with an object. The method includes employing application code to create a base class proxy object and creating an application code generic proxy, where the application code generic proxy inherits from the base class proxy object and overrides a base class invocation method in the application code generic proxy, where the overridden method will receive an intercepted method call invoked on the object imaged by the proxy. The method further includes intercepting a method call on the object imaged by the proxy, routing the method call to the application code generic proxy, the application code generic proxy performing proxy pre-processing, and then invoking a method on the object imaged by the proxy. The method further includes the application code generic proxy receiving a return message from the object imaged by the proxy, the application code generic proxy performing proxy post-processing and the application code generic proxy returning a result to the entity that generated the intercepted method call.

Still another aspect of the present invention provides a data packet adapted to be transmitted between two or more computer processes where the data packet includes one or more identifier/value pairs, the identifier identifying the value associated with the identifier/value pair, and the value providing information associated with an intercepted method call on an object imaged by a proxy. Such name/value pairs may be subject to actions including, but not limited to, inspection, addition and/or deletion from a message object that is (de)serializable, and thus passable across a remoting boundary, by the present invention. In one example of the present invention, the information associated with an intercepted method call on an object imaged by a proxy may include, but is not limited to, a method name, one or more input parameters, a count of the number of parameters input to the method, one or more type identifiers associated with the input parameters, a count of the number of return parameters for the method, one or more type identifiers associated with the return parameters, class/interface defining method data, a stack pointer and a heap pointer.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Prior Art

DETAILED DESCRIPTION OF THE INVENTION

Figure 1:
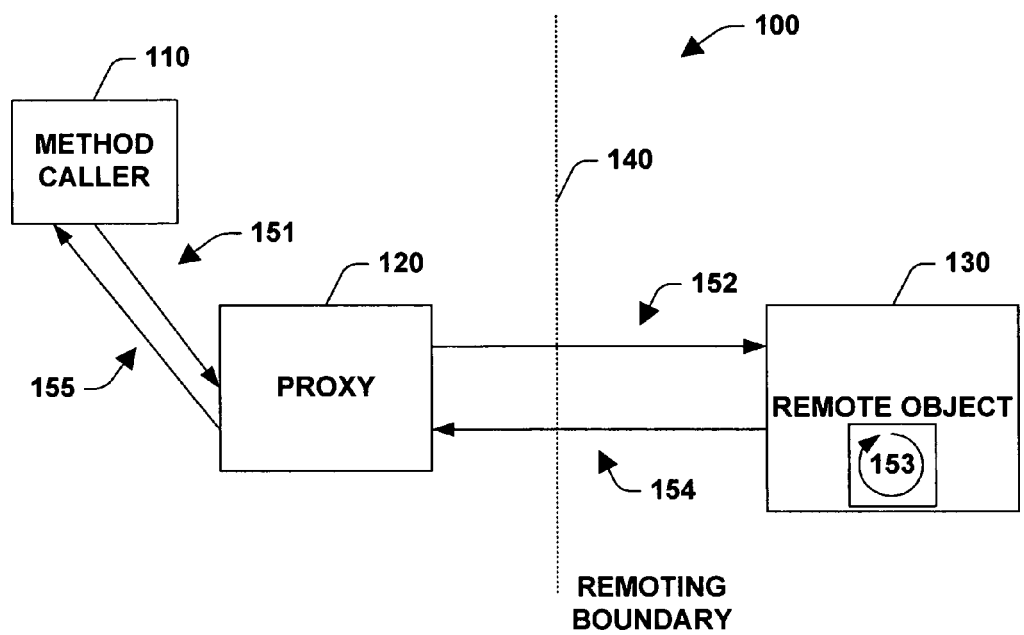
FIG. 1 is a process flow diagram illustrating conventional distributed object system remote method call processing.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, or software in execution. For example, a component may be, but is not limited to being, a process running on a processor, a processor, an object, an executable, a thread of execution, a program, and a computer. By way of illustration, both an application running on a server and the server can be a component.

It is to be appreciated that various aspects of the present invention may employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks may be employed.

Prior Art FIG. 1 illustrates conventional distributed object system remote method call processing. A conventional system 100 includes a method caller 110, a proxy 120 and a remote object 130. The remote object 130 may be located across a remoting boundary 140 (e.g., machine, domain, process). While Prior Art FIG. 1 is described primarily in the context of a remote object (e.g., remote object 130), it is to be appreciated that a proxy (e.g., proxy 120) may be employed to image a local object.

The method caller 110 may be, for example, a process, a thread, an object, an application and the like. For example, the method caller 110 may be a browser application and the remote object 130 may implement a stock market data feed. The method caller 110 may desire to access the stock market data feed and thus may invoke a method on the remote object 130.

It is to be appreciated that there are different types of proxies. For example, generic proxies may be employed to proxy many types of objects where the type of the object being proxied is typically passed to a generic proxy during construction. The generic proxy thus employs the supplied type information to behave as an instance of the supplied type with a resulting one-to-many mapping possible between generic proxies and the types being proxied.

In contrast, code-generated proxies have a one-to-one mapping with the types being proxied and thus are simpler to implement (including inserting application code interception at compile time) but typically are less efficient. Since generic proxies are more efficient and more flexible and thus preferred over code-generated proxies, the present invention facilitates application interception for generic proxies.

The method caller 110 makes a method call on the object 130. Since the object 130 is imaged by the proxy 120 the method call is intercepted and routed to the proxy 120. Thus, control passes at 151 from the method caller 110 to the proxy 120, rather than from the method caller 110 to the remote object 130. It is to be appreciated that such interception and routing is conventionally performed by system code. The method caller 110 may thus remain unaware that control passed at 151 to the proxy rather than passing directly to the remote object 130.

As used in this application, the term "system code" refers to code that is typically included in a system like an operating system, a remoting infrastructure, an intercepting infrastructure, an object system, and the like. A remoting infrastructure provides support for actions like passing arguments to a remote object across a remoting boundary, calling a remote object method with the arguments and returning results back to a proxy from a remote object. System code typically provides services (e.g., data communications, memory management, process control, etc.). Such system code is typically written by system programmers (e.g., operating system company employees) and is not accessible to application programmers, and if accessible it is typically not adaptable by application programmers. System code may be distributed in widespread releases by large vendors, which can limit the adaptability of such code. As used in this application, the terms "application code" and "user code" refer to code that is typically written by an application programmer or a system user. Such code is typically employed to produce custom applications.

Since the interception and control passing in Prior Art FIG. 1 is performed by inaccessible system code, data concerning the method call made by the method caller 110 would typically not be available to application programmers. Similarly, the internals of the proxy 120 are conventionally inaccessible to application programmers. While the proxy 120 facilitates accessing the remote object 130 across the remoting boundary 140, and while such access is beneficial, such access is of limited value because application programmers are excluded from an opportunity to perform processing in the proxy 120 before subsequent processing occurs. At 152, the proxy 120 automatically invokes a method on the remote object 130. The invocation at 152 may include passing data (e.g., input parameters) to the remote object 130. Again, such invocation is conventionally handled by system code, and is inaccessible, and thus inadaptable, by application code.

At 153, the remote object 130 performs work associated with the method call, and at 154 passes return data (e.g., return parameters) to the proxy 120. For example, at 153 the remote object 130 may access a database, retrieve a value identified by the method caller 110, compute a value requested by the method caller 110, update the database and return a value to the proxy 120. At 155, the proxy then returns data to the method caller 110. Again, since the returning mechanism associated with 154 and 155 is conventionally implemented by inaccessible system code, application programmers are excluded from an opportunity to perform processing in the proxy 120 when the result is received from the remote object 130 and before the result is passed to the method caller 110 at 155. In conventional systems like system 100, the method caller 110 may be unaware that the proxy 120 exists and that the remote invocation occurred. Thus, using such conventional systems, although the method caller 110 acquires the benefit of access to remote objects, the method caller misses out on opportunities to adapt and/or extend the system 100 through processing that could be performed in the proxy 120 before the method is invoked on the remote object 130 and before results are passed back to the method caller 110.

Figure 2:
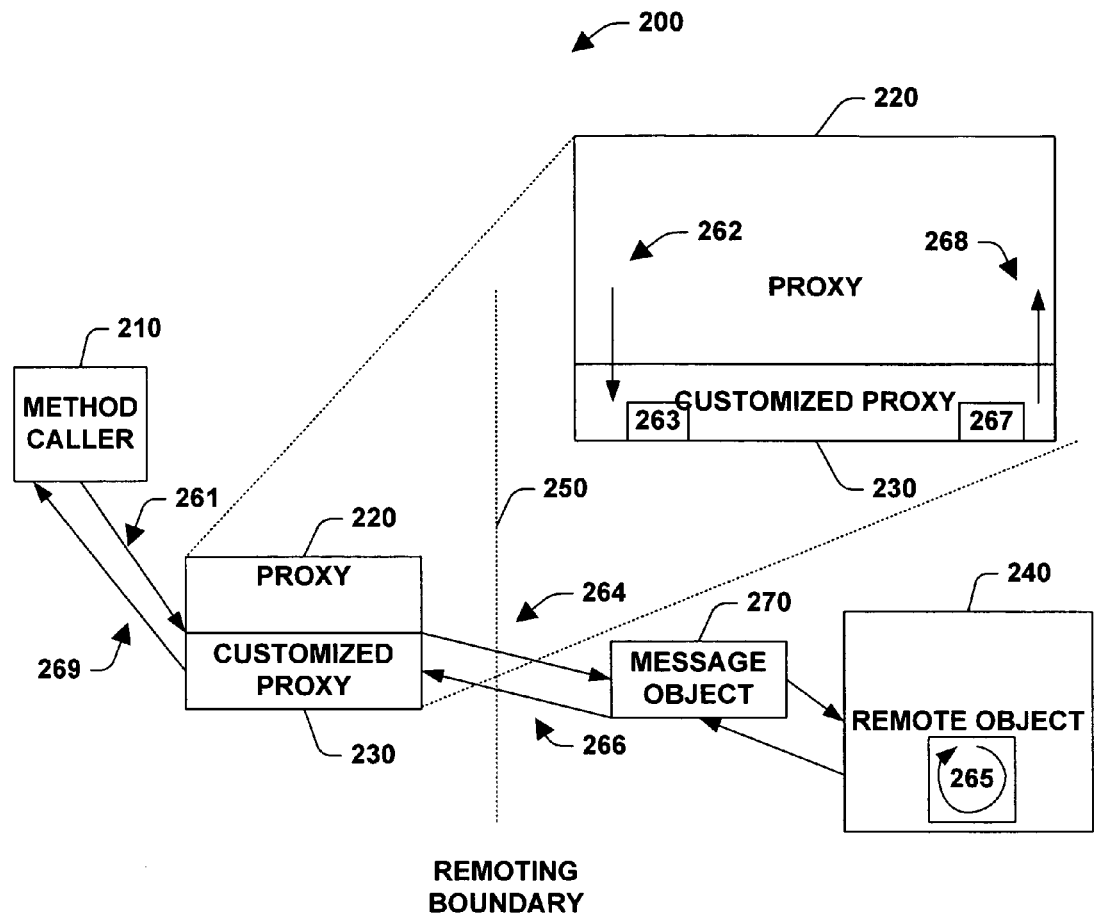
FIG. 2 is a process flow diagram illustrating distributed object system remote method call processing as performed by an aspect of the present invention.

Turning now to FIG. 2, improved distributed object system remote method call processing as facilitated by the present invention is illustrated. A system 200 includes a method caller 210, a proxy 220, a customized proxy component 230 and a remote object 240 located across a remoting boundary 250 (e.g., machine, domain, process) from the proxy 220. While FIG. 2 is described primarily in the context of a remote object (e.g., remote object 240), it is to be appreciated that a proxy (e.g., proxy 220) may be employed to image a local object and that a method may be invoked on such a local object without crossing the remoting boundary 250. The system 200 facilitates passing a message object 270 to and/or from the remote object 240. In one example of the present invention, when a method caller 210 invokes a method on the proxy 220, a call stack is converted to a request message object 270 that is passed to the application proxy 220 invoke method. The message object 270 may be referred to as a request message object 270 since it contains input data. The application proxy 220, after pre-call processing, employs a stack builder to convert the request message object 270 to a call stack for invoking the object being proxied.

The application proxy 220 may also perform post-call processing and employ a base proxy to propagate a response message object 270 that contains response message data that is propagated onto the call stack of the method caller 210. If there is a remoting boundary between the proxy 220 and the object being proxied, then the request and response messages are (de)serialized in the request and response directions respectively. The request and/or response messages may include one or more name/value pairs carrying information including, but not limited to a method name, one or more input parameters, a count of the number of parameters input to the method, one or more type identifiers associated with the input parameters, a count of the number of return parameters for the method, one or more type identifiers associated with the return parameters, class/interface defining method data, a stack pointer and a heap pointer. Such name/value pairs may be subject to actions including, but not limited to, inspection, addition and/or deletion from a message object that is (de) serializable, and thus passable across a remoting boundary, by the present invention.

The method caller 210 may be, for example, a process, a thread, an object, an application and the like. For example, the method caller 210 may be a browser application and the remote object 240 may implement a stock market data feed. The method caller 210 may desire to access the stock market data feed and thus may invoke a method on the remote object 240.

The method caller 210 makes a method call on the object 240. Since the object 240 is imaged by the proxy 220 and is located across the remoting boundary 250, the method call is intercepted and routed to the proxy 220. Thus, at 261 control passes from the method caller 210 to the proxy 220, rather than from the method caller 210 to the remote object 240. While such interception and routing is conventionally performed by system code, the present invention facilitates gaining access to such interception and routing functionality. Thus, the proxy 220 includes a customized proxy component 230 that can be written in application code by application programmers and which has access to the interception and routing functionality provided by system code (e.g., operating system, intercepting infrastructure, remoting infrastructure, distributed object system). The customized proxy component 230 can be, therefore, operable to adapt and/or extend the functionality provided by a conventional proxy (e.g., proxy 120, Prior Art FIG. 1), which facilitates mitigating flexibility problems associated with conventional systems.

At 261, when control passes to the proxy 220, the customized proxy 230 is given an opportunity to perform work coded into the customized proxy 230 in application code by an application programmer. Thus, at 262, after the proxy 220 performs conventional system level work (e.g., process control, memory management, namespace resolution), the proxy 220 may pass control to the customized proxy 230. At 263, the customized proxy can execute application code, providing advantages over conventional systems that do not provide the ability to interact with the customized proxy 230. The application code may be employed in actions including, but not limited to, monitoring remote method calls, caching local data, caching remote data, controlling remote method call invocations and machine learning involved in optimizing remote method call invocation.

At 264, after executing the application code at 263, the customized proxy 230 can invoke a method on the remote object 240. Such invocation at 264 is facilitated by the customized proxy 230 having access to a remoting infrastructure. In one example aspect of the present invention, the processing associated with 264 may be performed by updating a field (e.g., a uniform resource identifier field in message object 270) and employing a remoting services dispatching method to invoke a method on the remote object 240. In the example aspect, the message object 270 can be employed as a container for communicating data between cooperating sinks employed in transporting the message object 270 between the proxy 230 and the remote object 240, where the message object 270 carries a set of named properties.

Since the customized proxy 230 had the opportunity at 263 to perform proxy pre-processing, the invocation at 264 may differ from the invocation at 152 (Prior Art FIG. 1) in ways including, but not limited to, the amount of data sent to the remote object 240, the type of data sent to the remote object 240 and which remote object(s), if any, are invoked at 264. By way of illustration, the proxy pre-processing may have determined that a database value had previously been cached in the proxy 220, and thus the database value could be passed to the remote object 240 and thus the database lookup described in association with Prior Art FIG. 1 may not occur. For example, in the web browser/stock market data feed example, a user may have previously inquired about a stock price for a company named AABBCC company. Before the stock price could be retrieved, the remote object 240 may have had to look up a ticker symbol for the company (e.g., AACo), and that ticker symbol may have been cached in the customized proxy 230. Thus, the ticker symbol, rather than the name of the company, may be sent to the remote object 240 which can eliminate a duplicate lookup in the remote object 240. By way of further illustration, proxy pre-processing performed by the customized proxy 230 may have determined that a second remote object may be better suited to handle the method invoked by the method caller 210 than a first remote object, and thus the customized proxy 230 may invoke the method on the second remote object instead of the first remote object. For example, returning to the browser/stock market data feed example, the customized proxy 230 may have determined that recent stock market inquiries on a first remote object have taken sixty seconds, while a response time of five seconds is desired. Thus, the customized proxy 230 may acquire the stock market price from a different remote object and compare the average response times to determine how more optimal response times can be achieved. Thus, increases in performance may be achieved for the method caller 210.

By providing application programmers with the opportunity to produce and custom craft the customized proxy 230 and thus to engage in proxy pre-processing, the proxy 220 can be adapted and/or extended beyond the capabilities provided by conventional systems. At 266, after the remote object 240 performs processing at 265 associated with the method call, the remote object 240 returns data (e.g., return parameters) to the customized proxy 230. In one example aspect of the present invention, a remoting services parameter processing method may be employed to process a return message and/or message object 270 passed by a remoting services message returning method. Similar to the opportunity to perform proxy pre-processing, the customized proxy 230 has an opportunity to perform proxy post-processing. Thus, before 269, where a result is passed to the method caller 210, the customized proxy 230 may perform processing at 267 and at 268 pass the result to the proxy 220. By way of illustration, the customized proxy 230 may have received data in a first format (e.g., day, month, year) from the remote object 240 while the method caller 210 may be expecting data in a second format (e.g., month, day, year), and thus the customized proxy 230 may, at 267, translate between the formats before passing the result to the proxy 220 at 268. Thus, the method caller 210 may benefit by gaining access to a remote object 240 and by receiving data in an expected format that removes the need to reformat such data at the method caller 210. Data reformatting is but one simple example of processing performed by the customized proxy 230. Proxy post-processing can include, but is not limited to monitoring remote method calls, caching local data, caching remote data, controlling remote method call invocations and machine learning involved in optimizing remote method call invocation.

Thus, FIG. 2 illustrates a system 200 that has advantages over conventional systems in that the system 200 provides application programmers with a message object 270, access to proxies and the opportunity to perform proxy pre-processing and proxy post-processing, which facilitates adapting and extending the capabilities of conventional systems.

It is to be appreciated that although FIG. 2 illustrates the customized proxy 230 invoking the method on the remote object 240 and receiving the result from the remote object 240, that the customized proxy 230 may employ the proxy 220 to invoke the method on the remote object 240 and may receive the result from the remote object 240 through the proxy 220. It is to be further appreciated that various combinations of the proxy 220 and the customized proxy 230 invoking the method on the remote object 240, passing data to the remote object 240 and receiving results from the remote object 240 are contemplated by the present invention.

In one alternative example of a system 200, the invocation at 264, the remote processing performed at 265 and the return at 266 may not be performed. By way of illustration, the customized proxy 230 may determine that it is capable of performing the method call invoked by the method caller 210, and thus it may perform such processing without invoking the remote object 240, providing improvements in processing speed. Returning to the browser/stock market data feed example, the customized proxy 230 may be programmed to prevent constant access to the stock market data feed due to bandwidth concerns at the method caller 210 site. The customized proxy 230 may, therefore, limit stock market update requests to one per period of time (e.g., one per minute) and return a "query limit exceeded" message to the method caller 210 on excessive calls to the customized proxy 230. Such local processing in the customized proxy 230 may also occur, for example, when the remote object 240 has been marshaled by value and thus the proxy 220 and/or the customized proxy 230 may not be required to communicate across the remoting boundary 250. For example, if the market is closed, and the method caller 210 is seeking access to the Dow Jones Industrial Average quote and the stock market data feed was marshaled by value to the customized proxy 230, then the closing quote can be returned to the method caller 210 without invoking a method on the remote object 240 until the market reopens.

Figure 3:
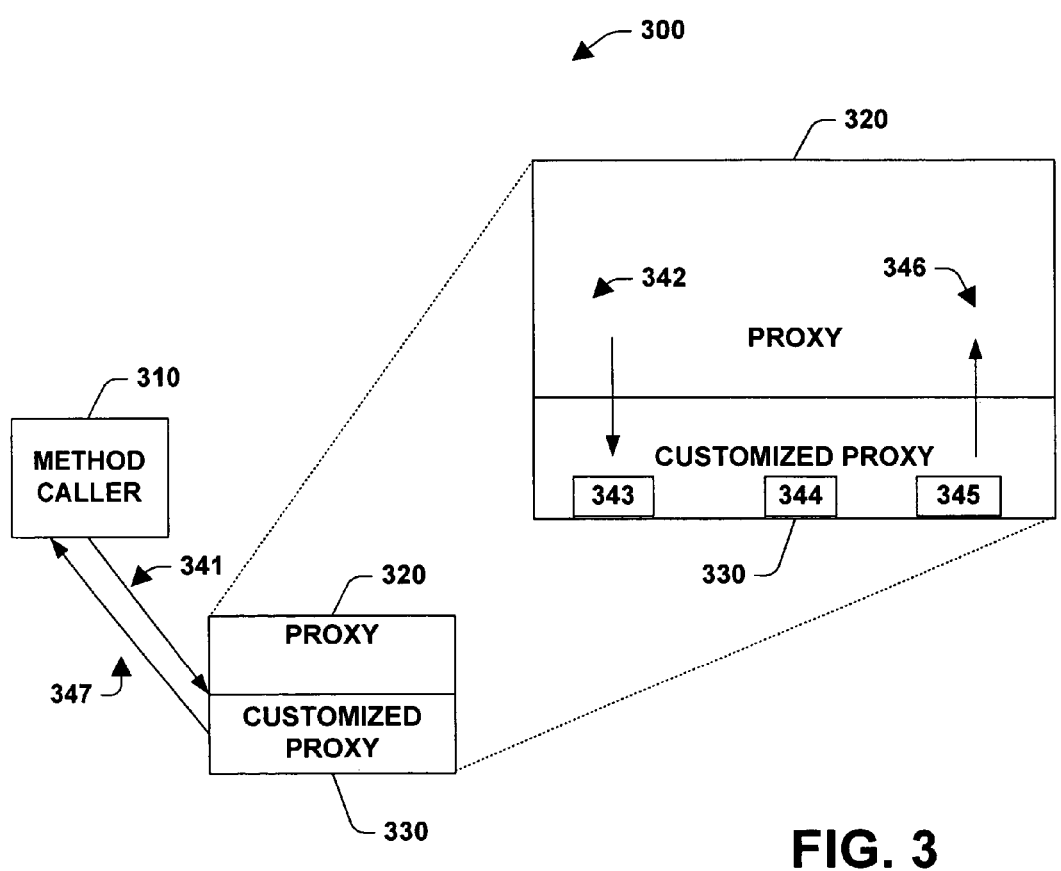
FIG. 3 is a process flow diagram illustrating local object system method call processing as performed by an aspect of the present invention.

Turning now to FIG. 3, a process flow diagram illustrates a system 300 engaging in local processing in a customized proxy 330. The system 300 includes a method caller 310, a proxy 320 and a customized proxy 330. The method caller 310 may be, for example, a process, a thread, an object, an application and the like. The method caller 310 makes a method call on an object that has been imaged by the proxy 320. At 341, the method call is intercepted and routed to the proxy 320. The proxy 320 may perform system level processing (e.g., name space resolution, memory management, etc.) and then, at 342, pass control to the customized proxy 330. The customized proxy 330 may be written in application code by an application programmer. The application programmer may have included code that facilitates determining whether the customized proxy 330 can locally handle the method call made by the method caller 310. Thus, at 343, the customized proxy 330 may perform the determining processing and determine that the customized proxy 330 does not need to invoke a method on an object imaged by the proxy 320. Thus, at 344, the customized proxy 330 may perform local processing, which produces improvements in response time and reductions in data communications.

By way of illustration, the method caller 310 may have invoked a method call that can be employed to retrieve and/or calculate the batting average of a professional baseball player. Since such averages change only when a baseball player has an official at bat, such averages may change infrequently. Thus, an application programmer may have included code in the customized proxy 330 that can determine whether a player has had an at-bat since the last time the batting average for the player was retrieved and/or computed. If an at bat has occurred, then the customized proxy 330 may be able to perform local processing at 344 (e.g., retrieve a locally cached value) and return the result without invoking a method on a remote object, which can reduce network traffic, database lookups and processing required at a remote object. Thus, improvements in processing time can be achieved. Conventional systems do not provide an application programmer with the opportunity to add code to the proxy 320 and thus such improvements and reductions may not be achieved in conventional systems.

At 345, after the local processing of 344 has been completed, the customized proxy 330 can perform proxy post-processing and then, at 346, return a result to the proxy 346. It is to be appreciated that the result returned at 346 may be a signal, a data value, a reference, a data structure, and other similar items. At 347, the proxy 320 can return a result to the method caller 310, who may be unaware that the proxy 320 and the customized proxy 330 handled the method call locally, without invoking a method on an object imaged by the proxy 320.

Figure 4:
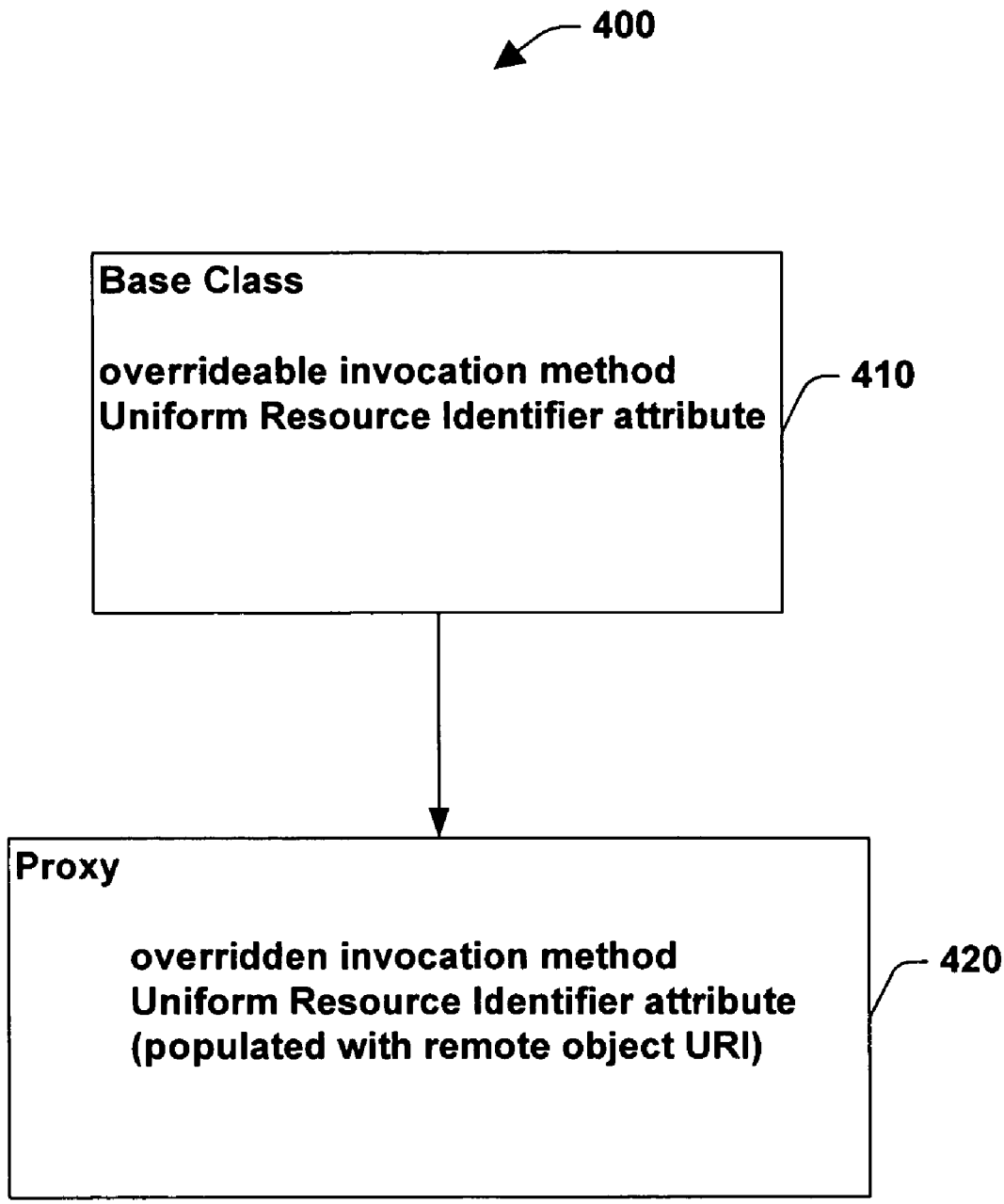
FIG. 4 is an object hierarchy diagram illustrating a base class and a deriving subclass in accordance with an aspect of the present invention.

FIG. 4 illustrates an object hierarchy 400 that includes a base class 410 and a deriving subclass 420. Object oriented programming, class hierarchies and the ability to override a base class method in a deriving class are known in the art and thus their basics are not discussed herein for the sake of brevity. The present invention provides a base class 410 from which an application developer can inherit to produce the subclass 420. The base class 410 provides entities including, but not limited to, methods, fields, attributes, metadata and properties that facilitate access to system level functionality (e.g., remoting functionality, intercepting functionality). By deriving from the base class 410, the subclass 420 can gain access to such system level functionality. Since the subclass 420 can be coded in application code, users can thus gain access to system level functionality.

In one example of the present invention, methods for creating a proxy (which is an instance of the subclass 420) include, but are not limited to, invoking an explicit creating function for the object imaged by the proxy (e.g., new operator, creates server object and proxy), employing a connection API (which creates a proxy to an existing object) and adding an attribute to a run time type (e.g., an attribute concerning a proxy that will cause an invoking function (e.g., new) to create the server object and the proxy). The instance of the subclass 420 can then gain access to system level functionality by overriding one or more base class methods and/or by manipulating one or more base class attributes. By way of illustration, one example base class, provides a method that can be overridden by the subclass 420 so that the overridden method can be invoked by an intercepting infrastructure when the distributed object system that provides the base class intercepts a method call on an object. When the overridden method is invoked, data associated with the intercepted method call can be made available to the overridden method. For example, data including, but not limited to, a method name, one or more input parameters, a count of the number of input parameters, one or more type identifiers associated with the input parameters, a count of the number of return parameters for the method call, one or more type identifiers associated with the return parameters, class/interface defining method data, a stack pointer and a heap pointer may be available. Thus, an application code instance of the subclass 420, which inherited from the base class 410, can be employed to adapt and/or extend the functionality provided by the base class 410 and the systems with which the base class 410 is associated.

A proxy that is an instance of the subclass 420 may perform proxy pre-processing and may also invoke a method on the object imaged by the proxy that is the instance of the subclass 420. In one example of such a proxy, the proxy may populate a Uniform Resource Identifier attribute with the URI (Uniform Resource Identifier) of an object on which the proxy desires to invoke a method. Then, the proxy may employ a remoting services dispatching method to invoke a method on the object identified in the Uniform Resource Identifier attribute. By overriding a method provided in the base class 410, by manipulating attributes made available in the base class 410 and by invoking methods provided in a remoting and/or intercepting infrastructure, an application code generic proxy (e.g., an instance of the deriving class 420), can gain access to remoting and/or intercepting processing conventionally limited to system code. Such access provides advantages (e.g., opportunity to pre-process, opportunity to post-process, opportunity to local process), to application developers who desire to extend and/or adapt functionality provided by conventional object systems.

One example distributed object system providing a base class 410 provides remoting services and channel services classes for application programmers. The remoting services class is used in publishing and consuming remoted objects and proxies while the channel services class is employed in enabling remoting channels to be registered and used. Remoting channels provide conduits for messages that cross remoting boundaries (e.g., a context, an application domain, a process, a machine).

One example object that can be employed to facilitate accessing proxies is an object referencing class object. An object referencing class object is a serializable representation of an object that is used to transmit an object reference across an application domain boundary. The act of creating an object referencing class object for an object is called marshalling. The object referencing class object can be transmitted via a channel into another application domain, which may be in another process or on another machine, for example. Once in the other application domain, the object referencing class object must be parsed to create a proxy for the object, which is generally connected to the remote object. The parsing/linking operation is called unmarshalling. Object referencing class objects may hold information including, but not limited to, an object type/class description, a unique identifier related to the specific object instance (e.g., a URI), and communication related information (e.g., how to reach the remoting subdivision of the object). Marshalling may be performed in different fashions depending on the nature of the object being marshaled.

For example, marshalling-by-value is employed for objects whose state does not change in interesting ways once the object is initialized (e.g., a DJIA quote object after the market has closed). Thus, the entire state of the object referred to by the object referencing class object may be sent to the proxy and a local object that is a clone of the remote object may be created. Marshalling-by-reference is employed when a reference to an object is converted to an object referencing class object so that the proxy created after unmarshalling can communicate with the remote object for most methods via the proxy.

Figure 5:
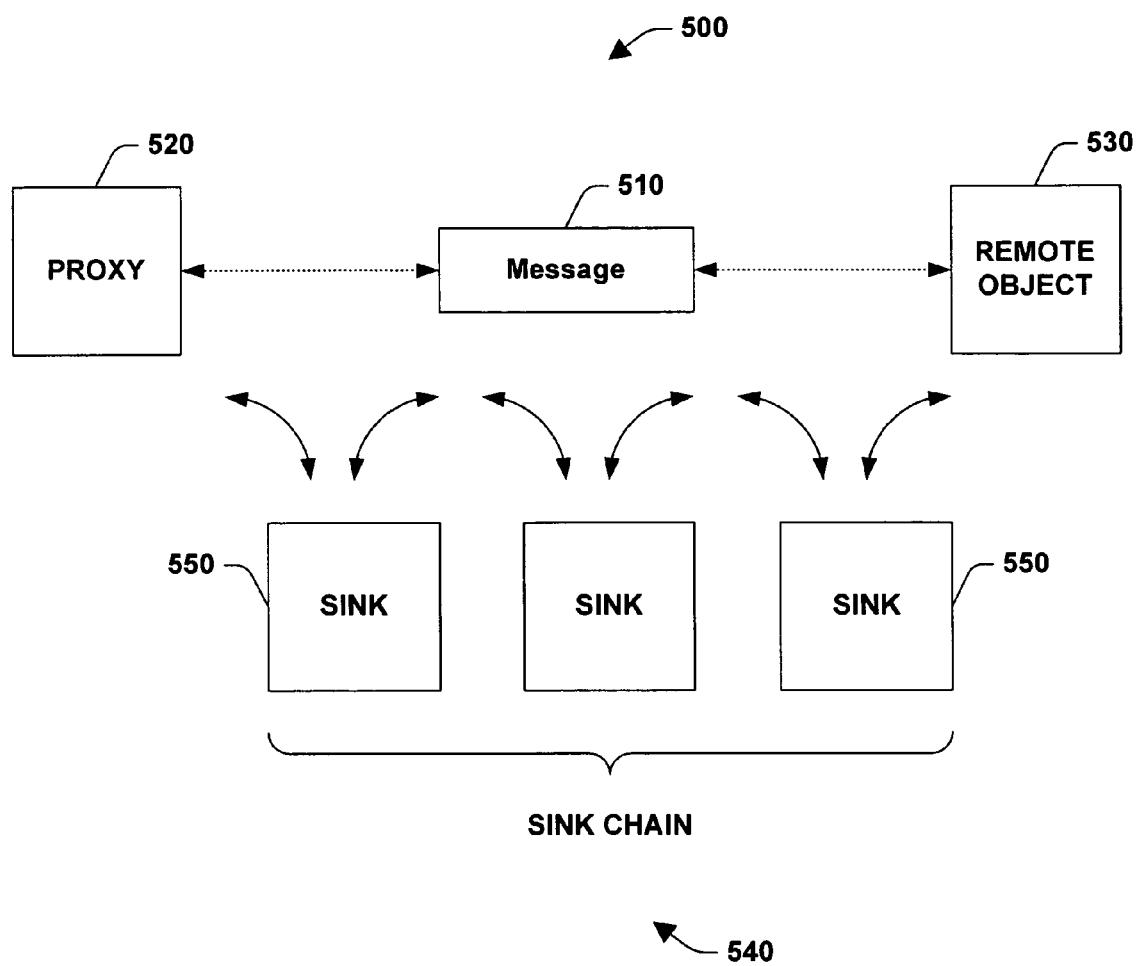
FIG. 5 is a message flow diagram illustrating message processing facilitated by a remoting infrastructure in accordance with an aspect of the present invention.

One of the system level functions to which an application code generic proxy gains access is illustrated in FIG. 5, which is a schematic block diagram of a system 500 for message processing facilitated by a remoting infrastructure. Logically, a message 510 travels between a proxy 520 and a remote object 530. But physically, the message 510 may traverse a sink chain 540 that includes one or more sinks 550. Conventionally, a system (e.g., remoting infrastructure) facilitates the logical and/or physical passing of the message 510 between the proxy 520 and the remote object 530. Although FIG. 5 is discussed in the context of a remote object 530, it is to be appreciated that the message 510 may traverse a sink chain 540 while passing from a proxy 520 to a local object.

Although conventional systems facilitate the logical and/or physical passing of the message 510, such conventional systems provide no mechanism for the proxy 520 to perform custom, user-directed application processing to monitor and/or control the processing of the message 510. The present invention provides the application programmer with the ability to add user written application code to the proxy 520, where such user written application code can be employed to monitor and/or control the processing of the message 510. By way of illustration, an application programmer may be aware that it is undesirable to have the message 510 traverse a first sink and that it is desirable to have the message 510 traverse a second sink. Conventionally, the application programmer had no (or limited) methods to monitor and/or control whether the message 510 was exposed to the first or second sink. But the present invention, by providing the ability to add user written application code to the proxy 520 facilitates monitoring and/or controlling whether the message 510 traverses the first (undesired) and second (desired) sinks.

Thus, benefits in monitoring and/or control are available to the application programmer employing the present invention.

Figure 6:
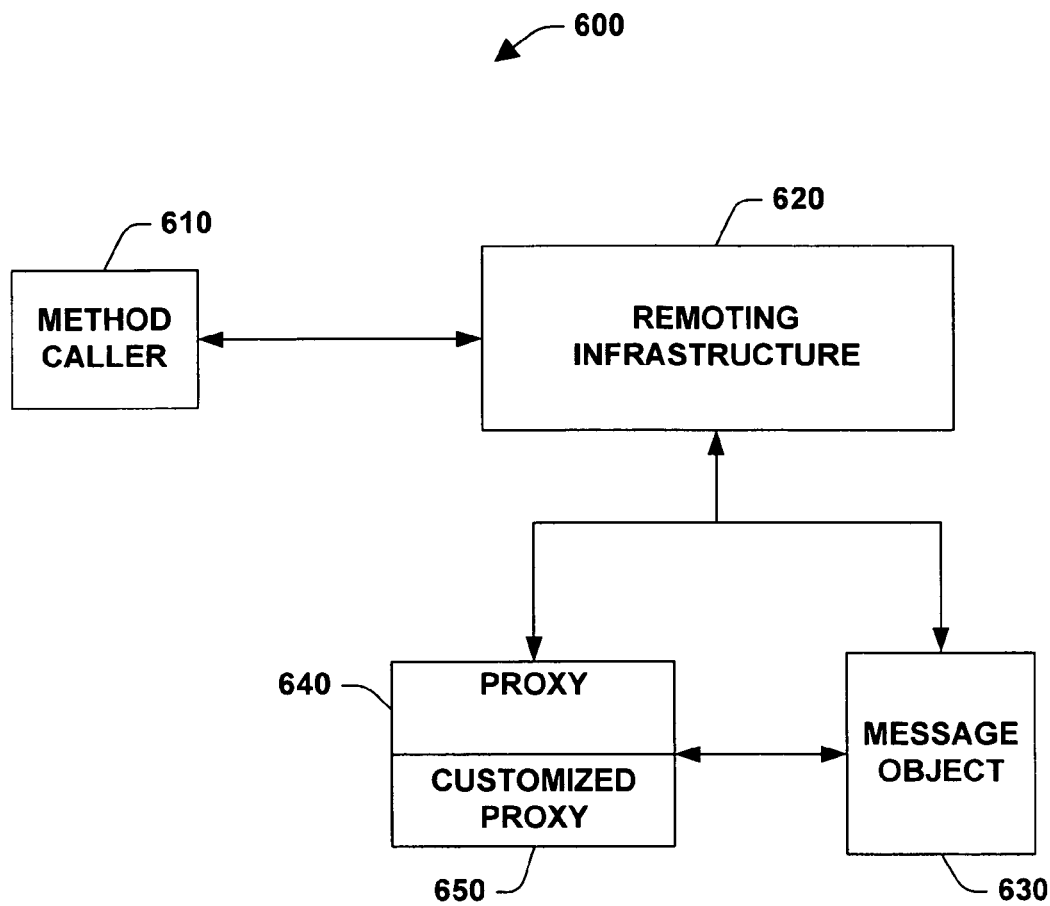
FIG. 6 is a schematic block diagram illustrating an application code generic proxy accessing a remoting infrastructure in accordance with an aspect of the present invention.

Such increased monitoring and/or control is facilitated by the ability to access a remoting infrastructure and to access method call data. Thus, FIG. 6 illustrates a system 600 that includes an application code generic proxy 650 accessing a remoting infrastructure 620. The remoting infrastructure 620 can provide functionality like message passing, sinking, message synchronization, passing arguments to remote object across remoting boundaries, calling a remote object method and returning results from a remote object to the proxy 640 and/or the customized proxy 650. Access to the remoting infrastructure 620 is facilitated by the presence of a message object 630.

When a method caller 610 invokes a method on an object imaged by the proxy 640, the method call is typically associated with one or more pieces of method call information. By way of illustration, the call information can include, but is not limited to, a method name, one or more input parameters, a count of the number of input parameters, one or more type identifiers associated with the input parameters, a count of the number of return parameters for the method call, one or more type identifiers associated with the return parameters, class/interface defining method data, a stack pointer and a heap pointer. Such method call information can be stored in the message object 630 and thus can be made available to the proxy 640 and the customized proxy 650. The method call information facilitates performing proxy pre-processing by providing the customized proxy 650 with information concerning the method call made by the method caller 610 (e.g., input parameters) and similarly facilitates proxy post-processing (e.g., by providing return parameter information). While FIG. 6 illustrates a customized proxy gaining access to a remoting infrastructure 620, with such access facilitated by the message object 630, it is to be appreciated that the object imaged by the proxy 640 and the customized proxy 650 may not be located across a remoting boundary. The present invention thus facilitates gaining access to an intercepting infrastructure that can be employed to facilitate improving proxies employed in imaging such local objects.

Figure 7:
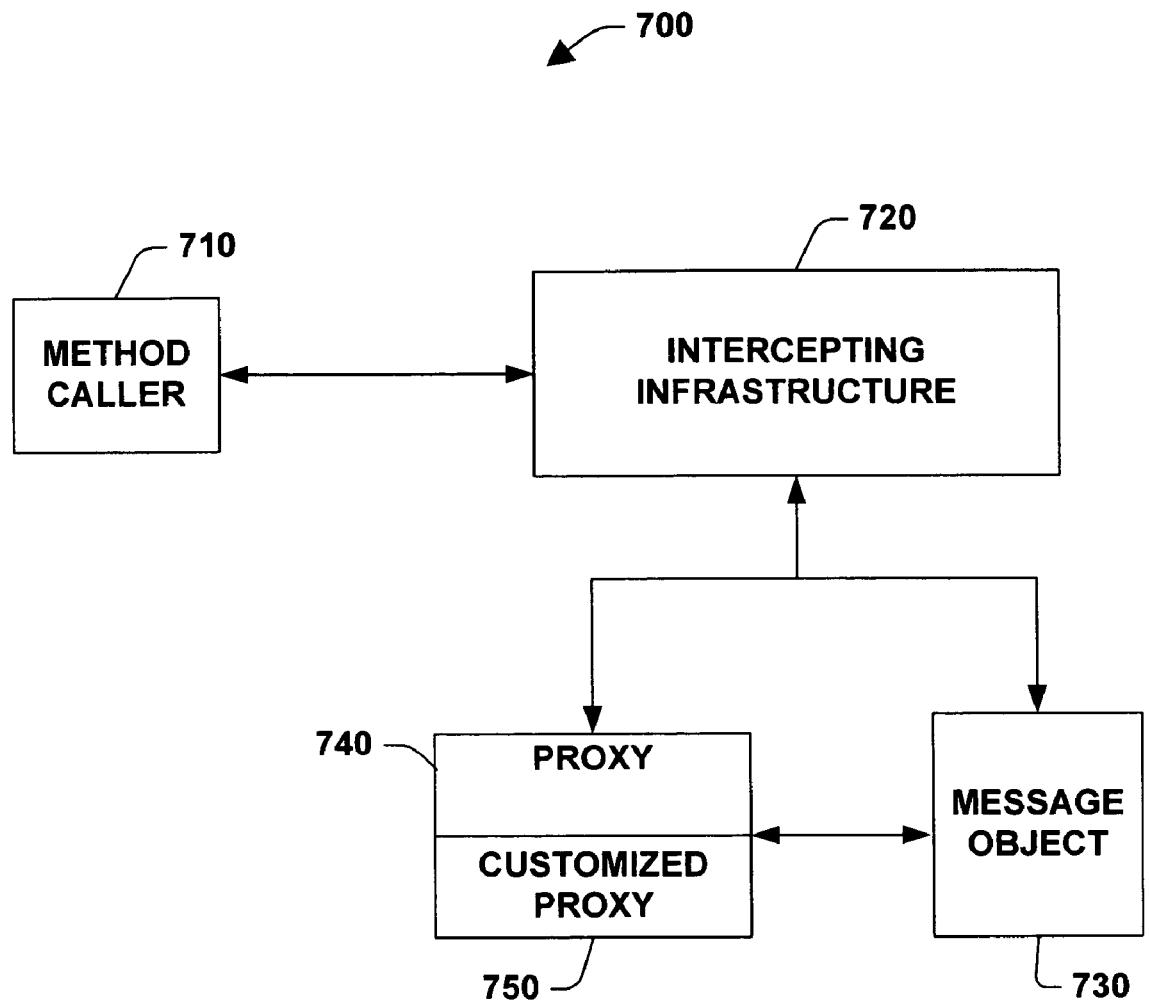
FIG. 7 is a schematic block diagram illustrating an application code generic proxy accessing an intercepting infrastructure in accordance with an aspect of the present invention.

Thus, FIG. 7 illustrates a system 700 that includes an application code generic proxy 750 accessing an intercepting infrastructure 720. The intercepting infrastructure 720 provides functionality including, but not limited to, intercepting a method call made by a method caller 710 on an object imaged by the proxy 740 and routing the method call to the proxy 740 and/or the customized proxy 750. Access to the intercepting infrastructure 720 is facilitated by the presence of a message object 730.

When a method caller 710 invokes a method on an object imaged by the proxy 740, the method call is typically associated with one or more pieces of method call information. By way of illustration, the call information can include, but is not limited to, a method name, one or more input parameters, a count of the number of input parameters, one or more type identifiers associated with the input parameters, a count of the number of return parameters for the method call, one or more type identifiers associated with the return parameters, class/interface defining method data, a stack pointer and a heap pointer. Such method call information can be stored in the message object 730 and thus can be made available to the proxy 740 and the customized proxy 750. The method call information facilitates performing proxy pre-processing by providing the customized proxy 750 with information concerning the method call made by the method caller 710 (e.g., input parameters) and similarly facilitates proxy post-processing (e.g., by providing return parameter information).

Thus, the system 700 can be employed to facilitate adapting and/or extending the functionality of the proxy 740 through the application coded customized proxy 750, which can be used in the intercepting manner illustrated in FIG. 7 in addition to and/or alternatively to the remoting manner illustrated in connection with FIG. 6.

Figure 8:
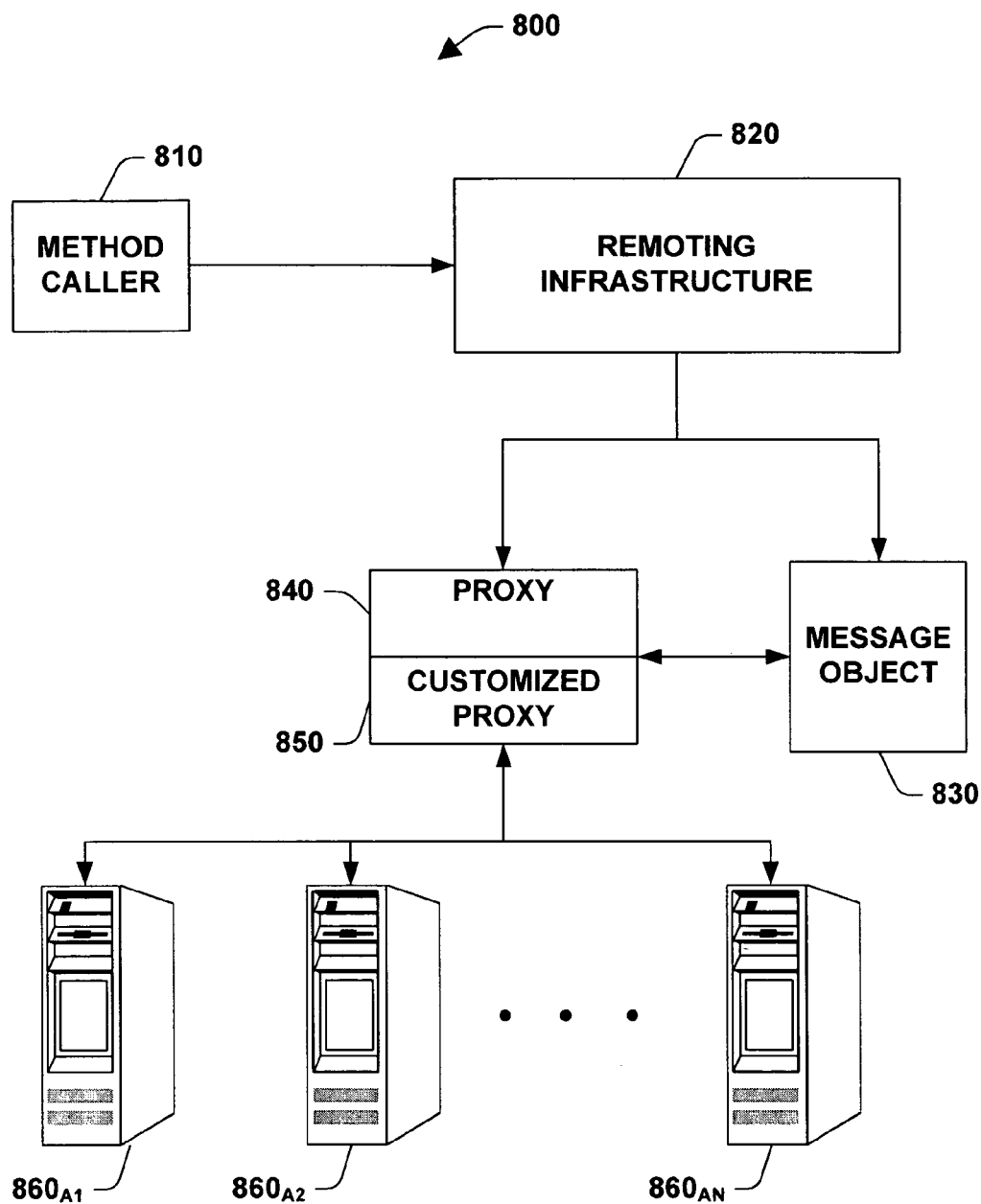
FIG. 8 is a schematic block diagram illustrating an application code generic proxy performing load balancing processing in accordance with an aspect of the present invention.

FIG. 8 illustrates a system 800 that includes an application code generic proxy 850 performing load balancing processing as an example of proxy pre-processing facilitated by the present invention. Such load balancing will demonstrate one of the advantages that the present invention provides over conventional systems that do not facilitate such proxy pre-processing. While FIG. 8 is described primarily in the context of remote objects it is to be appreciated that the proxy pre-processing described in connection with FIG. 8 may similarly be employed in a local object context and/or between local and remote objects.

The method caller 810 may be, for example, a process, a thread, an object, an application and the like. When the method caller 810 makes a method call on an object, a remoting infrastructure 820 and/or an intercepting infrastructure (not shown) may intercept the method call and route the call to a proxy 840 that images the object on which the method call was invoked. The proxy 840 has been customized with an application code customized proxy 850. The application code customized proxy 850 can be written by an application programmer in application code. The remoting infrastructure 820 and/or an intercepting infrastructure (not shown) may update a message object 830 with information related to the method call made by the method caller 810.

In an environment where there may be more than one entity that can perform processing associated with the method call, the customized proxy 850 may have been coded by an application programmer to attempt load balancing between such entities. In the system 800 a plurality of server computers $860_{A1}$ through $860_{AN}$, N being an integer, are illustrated. The server computers $860_{A1}$ through $860_{AN}$, may host one or more objects that are operable to perform processing associated with the method call. Thus, the customized proxy 850 may perform processing to determine to which, if any, of the server computers $860_{A1}$ through $860_{AN}$, the method call should be routed.

By way of illustration, during a first period of time the method caller 810 may have generated one thousand method calls. The customized proxy 850, through proxy pre-processing and/or proxy post-processing, may have determined that nine hundred of the one thousand calls had been routed to server $860_{A1}$, and that one hundred of the calls routed to server $860_{A1}$ had not been handled within an acceptable period of time. Thus, the customized proxy 850 may decide to route a percentage of subsequent method calls from the method caller 810 to a second server (e.g., server $860_{A2}$) in an attempt to have a greater percentage of method calls handled with an acceptable period of time.

By way of further illustration, the method caller 810 may generate a method call that will consume significant resources on whatever server hosts the object that processes the method call. Thus, the customized proxy 850 may query the servers $860_{A1}$ through $860_{AN}$, to determine which, if any, of the servers has sufficient resources to handle the resource intensive method call. The customized proxy 850 may then select which, if any, of the servers $860_{A1}$ through $860_{AN}$ will receive the method call.

These two examples illustrate one type of application coded enhancement that can be made to a proxy through aspects of the present invention. These examples are intended to be illustrative only, and not to limit the present invention.

Figure 9:
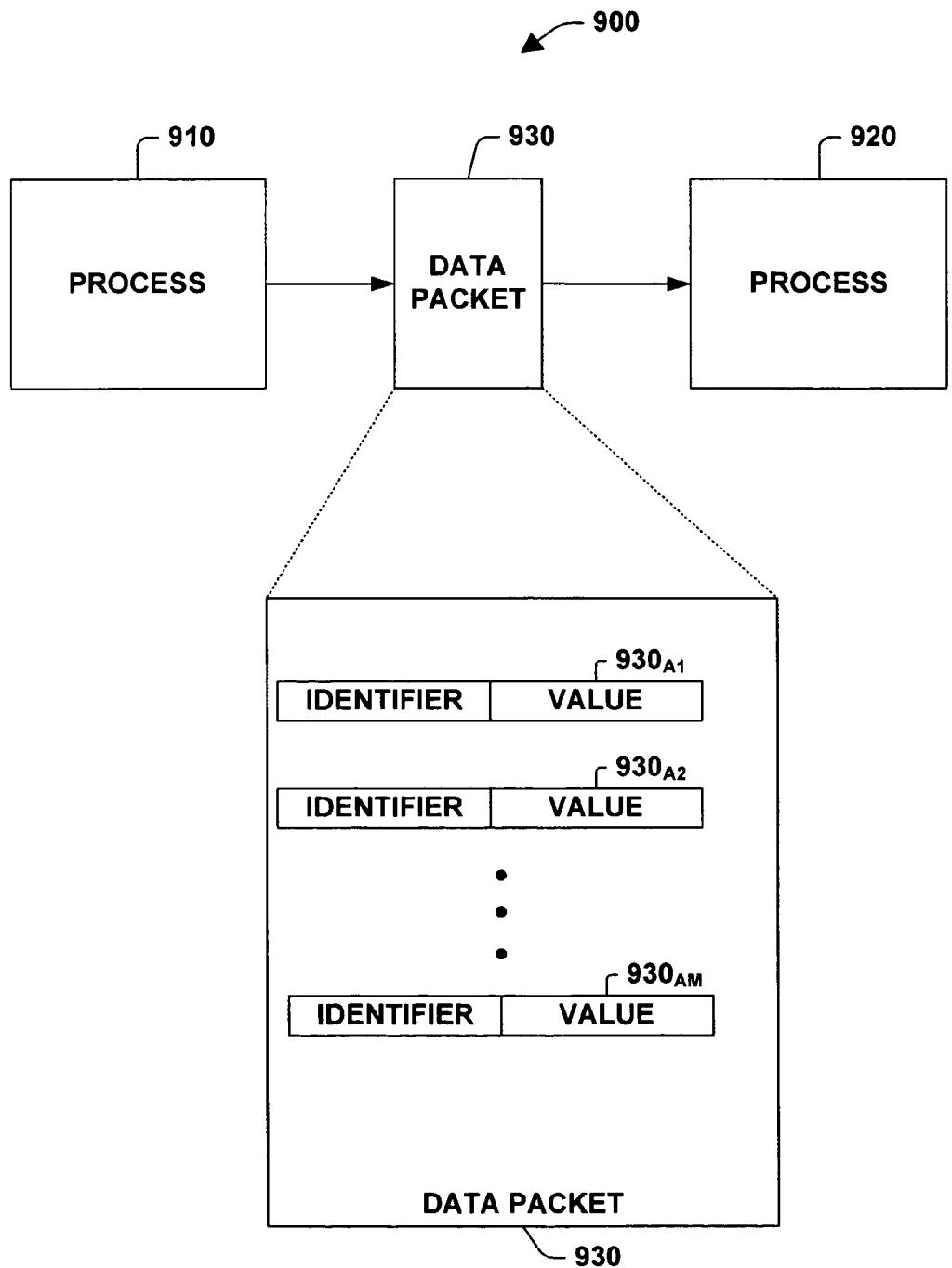
FIG. 9 is a schematic block diagram of a sample data packet employed in facilitating access to a remoting and/or intercepting infrastructure in accordance with an aspect of the present invention.

FIG. 9 illustrates a sample data packet 930 (e.g., a message object) employed in facilitating access to a remoting and/or intercepting infrastructure. The data packet 930 (e.g., a message object) is adapted to be transmitted between two computer processes (e.g., process 910 and process 920). The process 910 may be, for example, a remoting infrastructure and the process 920 may be, for example, an application code generic proxy. The data packet 930 (e.g., a message object) contains information concerning a method called on an object by a method caller, where the object is imaged by a proxy.

One example data packet 930 (e.g., a message object) contains one or more identifier/value pairs (e.g., pairs $930_{A1}$ through $930_{AM}$, M being an integer), where the identifier can be employed to determine the type and/or meaning of the value associated with the identifier/value pair and the value carries information associated with the method call. By way of illustration, a data packet 930 (e.g., a message object) may contain information associated with an intercepted method call that includes a method name identifier and a method name, one or more input parameter identifiers and one or more corresponding input parameter values, an identifier associated with a count of the number of parameters input to the method and a value associated with a count of the number of parameters input to the method, one or more identifiers associated with input parameter types and one or more values associated with input parameter types, an identifier associated with a count of the number of return parameters for the method and a value associated with the count of the number of return parameters for the method, class/interface defining method data, one or more type identifiers associated with the return parameters and one or more values associated with the return parameters and a heap pointer identifier and a heap pointer value. Thus, the data packet 930 (e.g., a message object) can facilitate communications between the processes 910 and 920 (e.g., the remoting infrastructure and the customized proxy) by making such method call information available.

Figure 10:
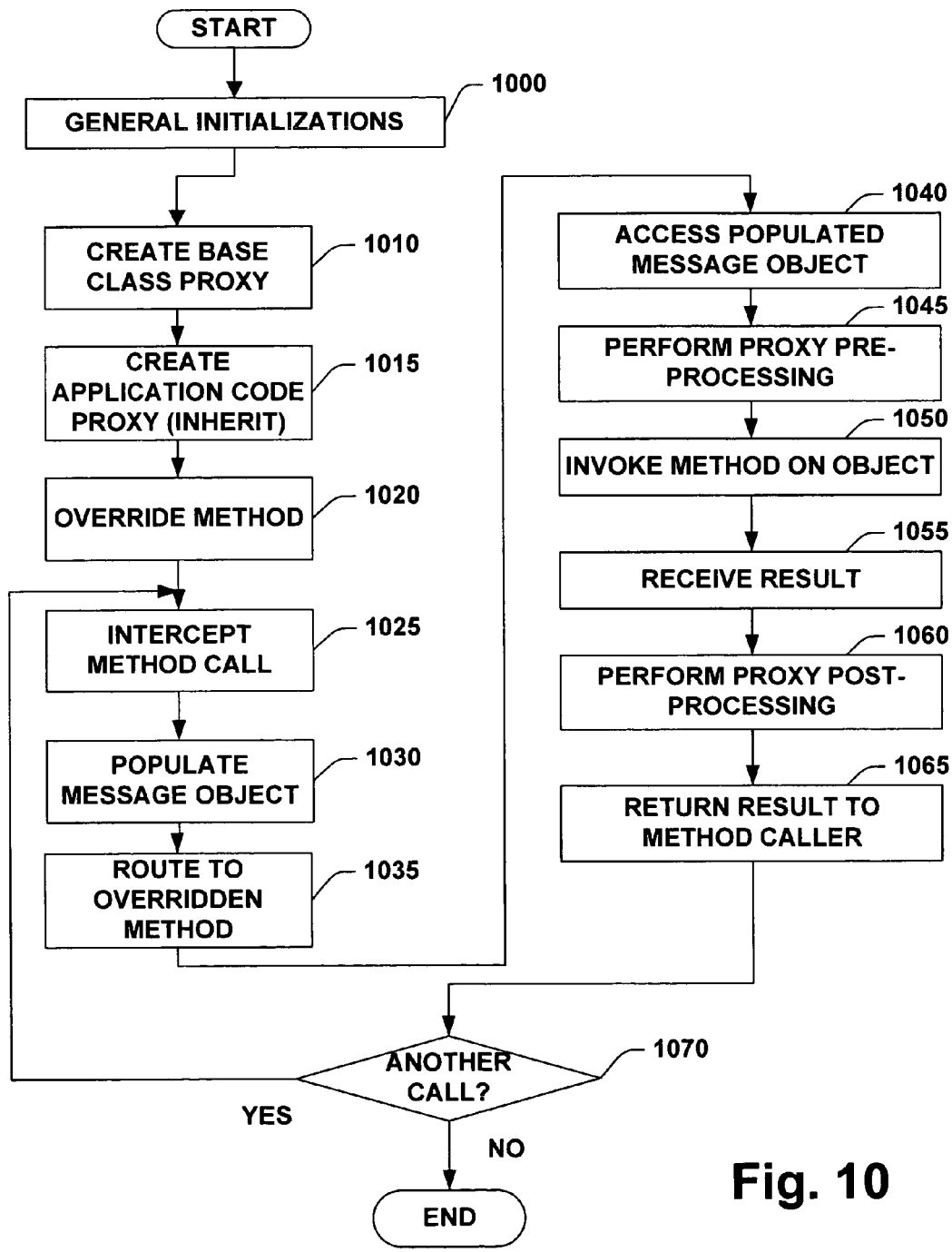
FIG. 10 is a flow chart of an example method for performing processing in accordance with an aspect of the present invention.
Figure 11:
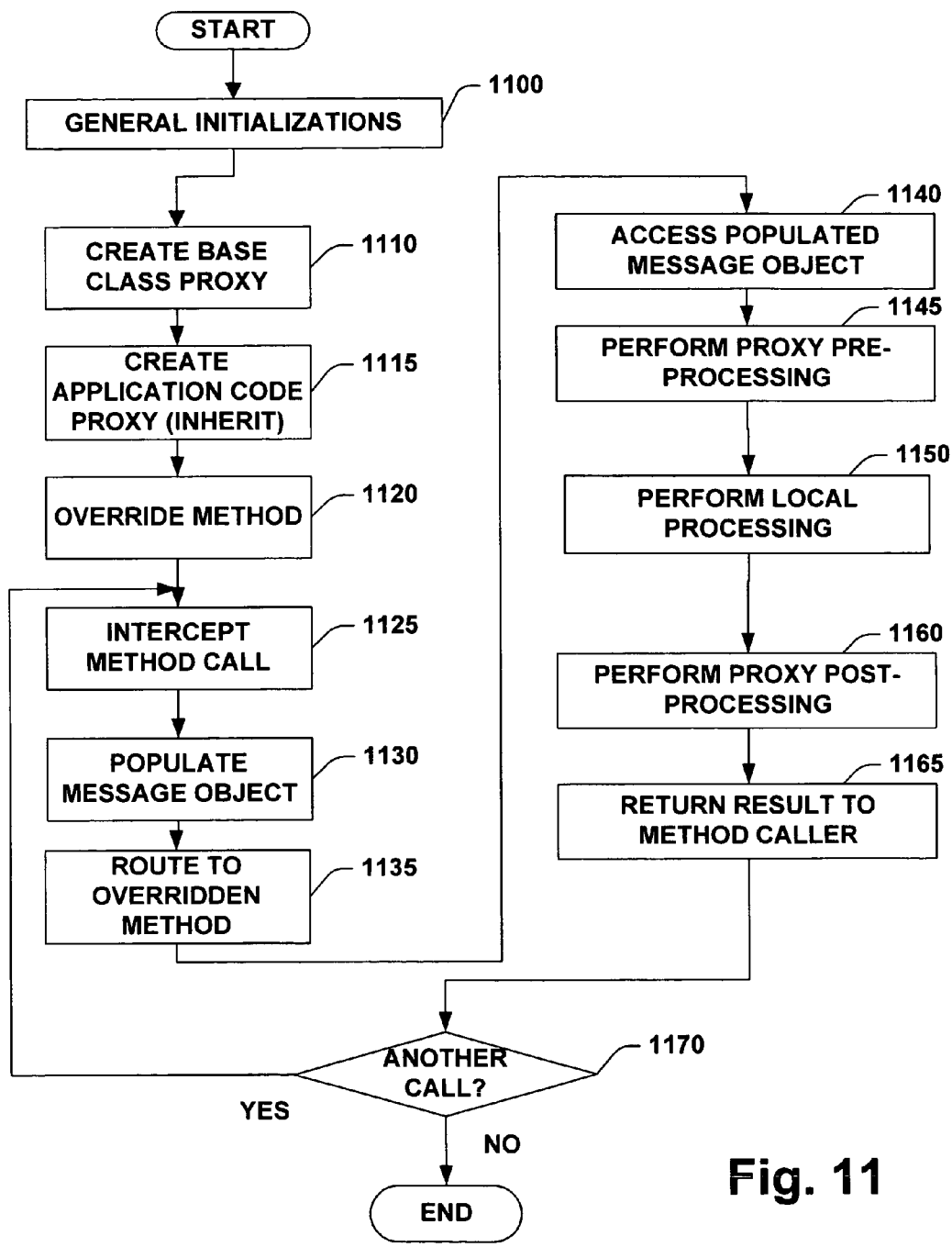
FIG. 11 is a flow chart of an example method for performing processing in accordance with an aspect of the present invention.

In view of the exemplary systems shown and described above, methodologies, which may be implemented in accordance with the present invention, will be better appreciated with reference to the flow charts of FIGS. 10 and 11. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

FIG. 10 illustrates a method for interacting with an object. At 1000, general initializations occur. Such initializations include, but are not limited to, allocating memory, establishing pointers, establishing data communications, acquiring resources, instantiating objects and setting initial values for variables.

At 1010, a base class proxy is created. The base class proxy may be created by methods including, but not limited to, invoking an explicit creating function for the object imaged by the proxy (e.g., new operator, creates server object and proxy), employing a connection API (which creates a proxy to an existing object) and adding an attribute to a run time type (e.g., an attribute related to the proxy that will cause an invoking function (e.g., new) to create the server object and the proxy). At 1015 an application code generic proxy is created. The application code generic proxy may similarly be created by methods including, but not limited to, invoking an explicit creating function for the application code generic proxy. The application code generic proxy will inherit from the base class proxy of 1010. The base class proxy will include a method that is available to be overridden by the application code generic proxy of 1015. Thus, at 1020, the base class method is overridden by the application code generic proxy, which facilitates receiving intercepted method calls on the object imaged by the proxy.

At 1025, a method call on the object imaged by the proxy is intercepted. Thus, control passes to the intercepting process, which, at 1030, can populate a message object with information related to the method call. For example, the information may include, but is not limited to, a method name, one or more input parameters, a count of the number of input parameters, one or more type identifiers associated with the input parameters, a count of the number of return parameters for the method call, one or more type identifiers associated with the return parameters, class/interface defining method data, a stack pointer and a heap pointer. At 1035, the intercepting process can route the intercepted method call to the overridden method in the application code generic proxy. Thus, rather than control passing from a method caller to an object that has been imaged by the proxy, control has passed from the method caller to the application code generic proxy that images the object.

At 1040, the application code generic proxy can access the populated message object to retrieve call information associated with the intercepted method call. Thus, the application code generic proxy has information available to it that facilitates performing user defined actions not possible in conventional systems. Thus, at 1045 proxy pre-processing can be performed. Such proxy pre-processing can include, but is not limited to, load-balancing, transaction processing, object migration and object persisting. At 1050, the application code generic proxy can invoke a method on the object that it images. The proxy may forward data (e.g., input parameters) to the imaged object. Such parameters may be sent individually and/or they may be contained in an object (e.g., a message object). Furthermore, the parameters may be sent by the base class proxy of 1010 or the application code generic proxy of 1015. It is to be appreciated that the transfer of control to the object imaged by the proxy and/or the application code generic proxy may be achieved by either the proxy or the customized proxy. Thus control will have passed from the method caller to the proxy and then to the imaged object. It is to be appreciated that the imaged object may be a remote object or a local object.

At 1055, a result may be received from the imaged object. For example, one or more return parameters may be received. Such parameters may be received individually and/or they may be contained in an object (e.g., a message object). At 1060, the application proxy may perform proxy post-processing. Such processing may include, but is not limited to, auditing, transaction processing, object migration and object persisting. The ability to perform such application coded post-processing in the application code generic proxy provides advantages over conventional systems by facilitating extending and/or adapting the functionality of the base class proxy.

At 1065, the application code generic proxy returns a result to the method caller. It is to be appreciated that the application code generic proxy may return such a result directly to the method caller or may return the result via the base class proxy of 1010.

At 1070, a determination is made concerning whether another method call is available to be intercepted. If the determination at 1070 is YES, then processing proceeds to 1025, otherwise processing may conclude.

FIG. 11 illustrates an alternative method for interacting with an object. At 1100, general initializations occur. Such initializations include, but are not limited to, allocating memory, establishing pointers, establishing data communications, acquiring resources, setting initial values for variables and displaying process activity.

At 1110, a base class proxy is created. The base class proxy may be created by methods including, but not limited to, invoking an explicit creating function for the object imaged by the proxy (e.g., new operator, creates server object and proxy), employing a connection API (which creates a proxy to an existing object) and adding an attribute to a run time type (e.g., an attribute on a proxy that will cause an invoking function (e.g., new) to create the server object and the proxy). At 1115 an application code generic proxy is created. The application code generic proxy will inherit from the base class proxy. The application code generic proxy may similarly be created by methods including, but not limited to, invoking an explicit creating function for the application code generic proxy. The base class proxy will include a method that is available to be overridden by the application code generic proxy of 1115. Thus, at 1120, the base class method is overridden by the application code generic proxy, which facilitates receiving intercepted method calls on the object imaged by the proxy.

At 1125, a method call on the object imaged by the proxy is intercepted. Thus, control passes to an intercepting process, which, at 1130, can populate a message object with information related to the method call. For example, the information may include, but is not limited to, a method name, one or more input parameters, a count of the number of input parameters, one or more type identifiers associated with the input parameters, a count of the number of return parameters for the method call, one or more type identifiers associated with the return parameters, class/interface defining method data, a stack pointer and a heap pointer. At 1135, the intercepting process can route the intercepted method call to the overridden method in the application code generic proxy. Thus, rather than control passing from a method caller to an object that has been imaged by the proxy, control has passed from the method caller to the application code generic proxy that images the object.

At 1140, the application code generic proxy can access the populated message object to retrieve call information associated with the intercepted method call. Thus, the application code generic proxy has information available to it that facilitates performing user defined actions not possible in conventional systems. Thus, at 1145 proxy pre-processing can be performed. Such proxy pre-processing can include, but is not limited to, monitoring remote method calls, caching local data, caching remote data, controlling remote method call invocations and machine learning involved in optimizing remote method call invocation.

At 1150, the application code generic proxy can perform local processing. By way of illustration, if the object that is imaged by the proxy was marshaled by value, then the application code generic proxy may contain information and logic sufficient to perform processing sufficient to handle the intercepted method call, which can lead to speed improvements and data communications reductions. Such local processing, facilitated by the ability to add application code customizations to proxies, provides improvements over conventional systems that may not be similarly adapted by application code.

At 1160, the proxy may perform proxy post-processing. Such processing may include, but is not limited to, monitoring remote method calls, caching local data, caching remote data, controlling remote method call invocations and machine learning involved in optimizing remote method call invocation. The ability to perform such application coded post-processing in the application code generic proxy provides advantages over conventional systems by facilitating extending and/or adapting the functionality of the proxy. At 1165, the application code generic proxy returns a result to the method caller. It is to be appreciated that the application code generic proxy may return such a result directly to the method caller or may return the result via the base class proxy of 1110.

At 1170, a determination is made concerning whether another method call is available to be intercepted. If the determination at 1170 is YES, then processing proceeds to 1125, otherwise processing may conclude.

Figure 12:
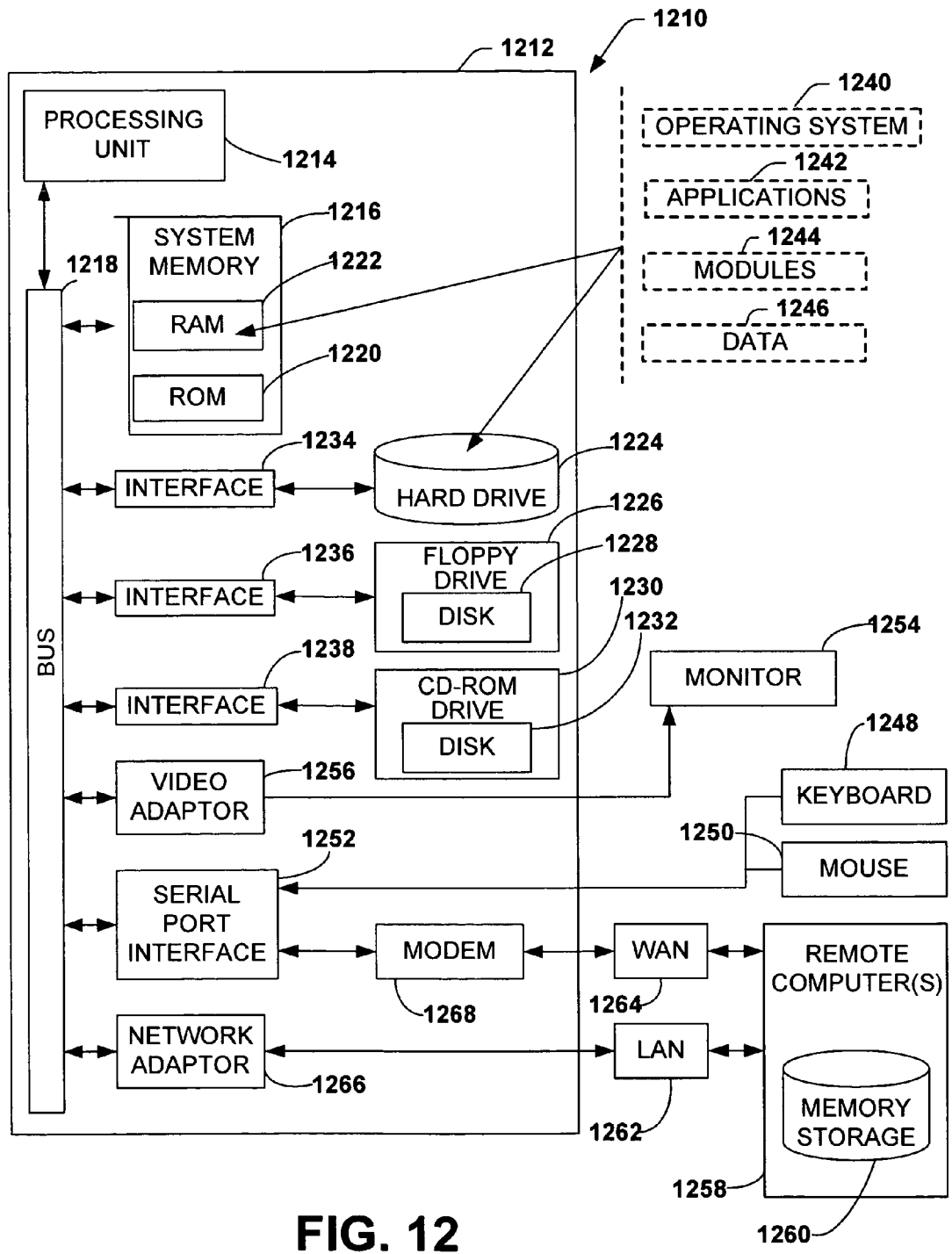
FIG. 12 is a schematic block diagram of an exemplary operating environment for a system configured in accordance with the present invention.

In order to provide additional context for various aspects of the present invention, FIG. 12 and the following discussion are intended to provide a brief, general description of one possible suitable computing environment 1210 in which the various aspects of the present invention may be implemented. It is to be appreciated that the computing environment 1210 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 12 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 12, an exemplary environment 1210 for implementing various aspects of the invention includes a computer 1212, including a processing unit 1214, a system memory 1216, and a system bus 1218 that couples various system components including the system memory to the processing unit 1214. The processing unit 1214 may be any of various commercially available processors. Dual microprocessors and other multi-processor architectures also can be used as the processing unit 1214.

The system bus 1218 may be any of several types of bus structure including a memory bus or memory controller, a peripheral bus, and a local bus using any of a variety of commercially available bus architectures. The computer 1212 memory includes read only memory (ROM) 1220 and random access memory (RAM) 1222. A basic input/output system (BIOS), containing the basic routines that help to transfer information between elements within the computer 1212, such as during start-up, is stored in ROM 1220.

The computer 1212 may further include a hard disk drive 1224, a magnetic disk drive 1226, e.g., to read from or write to a removable disk 1228, and an optical disk drive 1230, e.g., for reading a CD-ROM disk 1232 or to read from or write to other optical media. The hard disk drive 1224, magnetic disk drive 1226, and optical disk drive 1230 are connected to the system bus 1218 by a hard disk drive interface 1234, a magnetic disk drive interface 1236, and an optical drive interface 1238, respectively. The computer 1212 typically includes at least some form of computer readable media. Computer readable media can be any available media that can be accessed by the computer 1212. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1212. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1222, including an operating system 1240, an intercepting infrastructure, a remoting infrastructure, one or more application programs 1242, other program modules 1244, and program non-interrupt data 1246. The operating system 1240 in the illustrated computer can be any of a number of commercially available operating systems.

A user may enter commands and information into the computer 1212 through a keyboard 1248 and a pointing device, such as a mouse 1250. Other input devices (not shown) may include a microphone, an IR remote control, a joystick, a game pad, a satellite dish, a scanner, or the like. These and other input devices are often connected to the processing unit 1214 through a serial port interface 1252 that is coupled to the system bus 1218, but may be connected by other interfaces, such as a parallel port, a game port, a universal serial bus ("USB"), an IR interface, etc. A monitor 1254, or other type of display device, is also connected to the system bus 1218 via an interface, such as a video adapter 1256. In addition to the monitor, a computer typically includes other peripheral output devices (not shown), such as speakers, printers etc.

The computer 1212 may operate in a networked environment using logical connections to one or more remote computers, such as a remote computer(s) 1258. The remote computer(s) 1258 may be a workstation, a server computer, a router, a personal computer, microprocessor based entertainment appliance, a peer device or other common network node, and typically includes many or all of the elements described relative to the computer 1212, although, for purposes of brevity, only a memory storage device 1260 is illustrated. The logical connections depicted include a local area network (LAN) 1262 and a wide area network (WAN) 1264. Such networking environments are commonplace in offices, enterprise-wide computer networks, intranets and the Internet.

When used in a LAN networking environment, the computer 1212 is connected to the local network 1262 through a network interface or adapter 1266. When used in a WAN networking environment, the computer 1212 typically includes a modem 1268, or is connected to a communications server on the LAN, or has other means for establishing communications over the WAN 1264, such as the Internet. The modem 1268, which may be internal or external, is connected to the system bus 1218 via the serial port interface 1252. In a networked environment, program modules depicted relative to the computer 1212, or portions thereof, may be stored in the remote memory storage device 1260. It will be appreciated that the network connections shown are exemplary and other means of establishing a communications link between the computers may be used.

Figure 13:
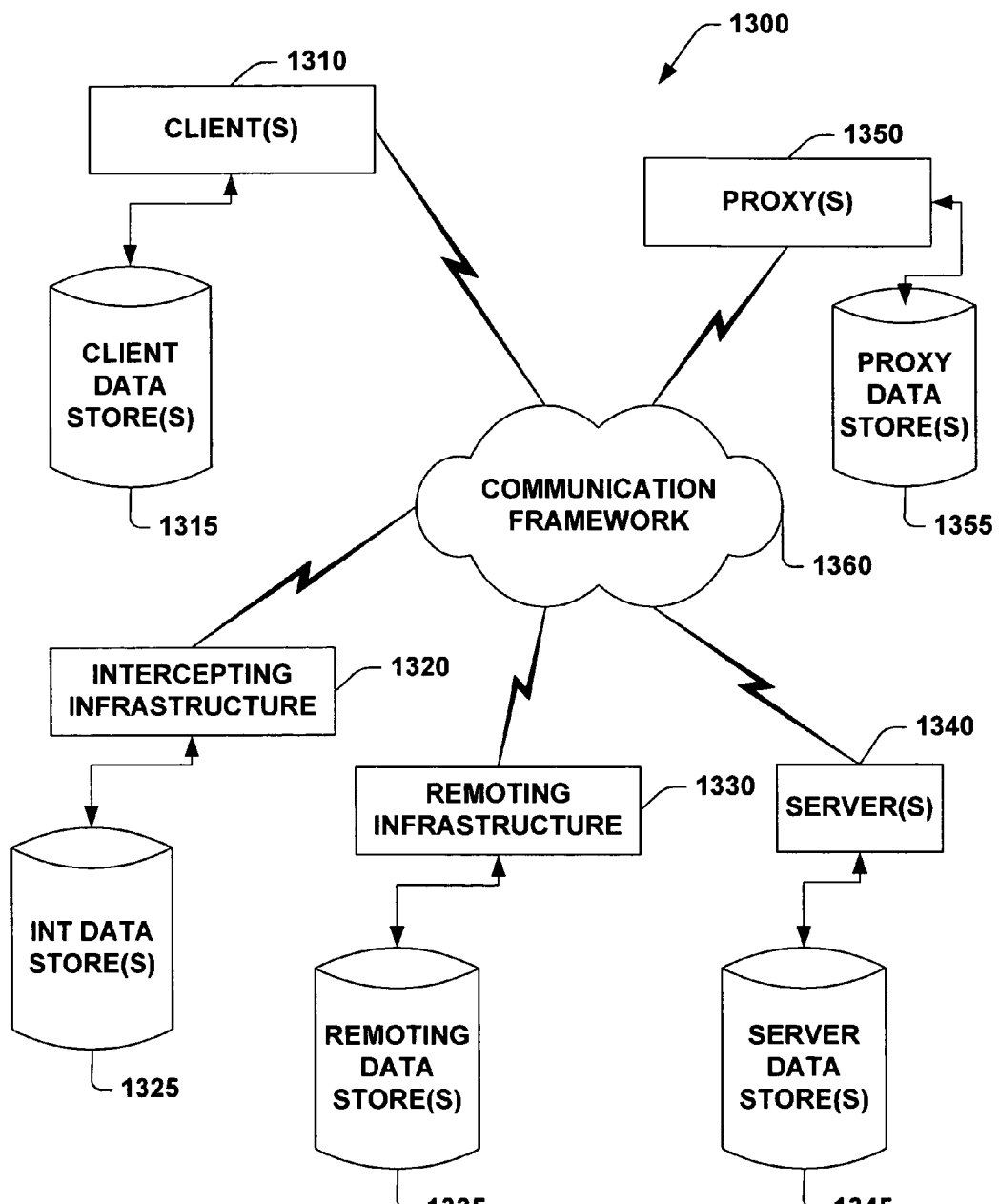
FIG. 13 is a schematic block diagram of an exemplary computing environment for a method performing in accordance with the present invention.

FIG. 13 is a schematic block diagram of a sample computing environment 1300 with which the present invention may interact. The system 1300 includes one or more clients 1310. The clients 1310 may be hardware and/or software (e.g., threads, processes, computing devices). The clients 1310 may attempt to invoke methods on one or more objects located local to the clients 1310 and/or remotely to the clients 1310. Such objects may be imaged by one or more proxies 1350. Thus, the system 1300 includes an intercepting infrastructure 1320 that can intercept such method calls and route the intercepted method calls to the proxies 1350. The proxies 1350 may determine that to process the intercepted method calls one or more methods should be invoked on objects located on one or more servers 1340. Thus, the proxies 1350 may employ a remoting infrastructure 1330 to route the method call invocations and to receive return results, which can then be passed back to the clients 1310.

The system 1360 includes a communication framework 1360 that can be employed to facilitate communications between the clients 1310, the intercepting infrastructure 1320, the remoting infrastructure 1330, the servers 1340 and the proxies 1350. In an example system where the clients 1310, the intercepting infrastructure 1320, the remoting infrastructure 1330, and the proxies 1350 are located within one physical device the communication framework 1360 may include, for example, an interprocess communication process and a bus. In an example where the clients 1310, the intercepting infrastructure 1320, the remoting infrastructure 1330, the proxies 1350 and the servers 1340 are distributed between a plurality of physical devices the communication framework 1360 may include, for example, networking hardware and software, both wired and non-wired.

The clients 1310 are operably connected to one or more client data stores 1315 that can be employed to store information local to the clients 1310. Similarly, the intercepting infrastructure 1320 may be operably connected to one or more intercepting data stores 1325 that can be employed to store information local to the intercepting infrastructure 1320. Likewise, the remoting infrastructure 1330 may be operably connected to one or more remoting data stores 1335, the servers 1340 may be operably connected to one or more server data stores 1345 and the proxies 1350 may be operably connected to one or more proxy data stores 1355 that can be employed to store information local to the remoting infrastructure 1330, the servers 1340 and the proxies 1350 respectively.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates interaction with an object that is stored either locally or remotely, comprising:
    a processor; and
    a memory storing instructions which, when executed by the processor, implement a method, the method comprising:
        creating a generic proxy representing a local image of the object, wherein the generic proxy is created and modified by an application developer through user accessible application code and represents one type of many types of objects and wherein the generic proxy can be configured to represent any of the many types of objects;
        sending a method call to the object from a local calling entity, the method call corresponding to a specific method;
        intercepting the method call on the object by an application code accessible method call intercepting process, wherein the application code accessible method call intercepting process populates a data store with data associated with the received method call, and the data store is accessible by the generic proxy;
        directly routing the method call to the generic proxy instead of the object;
        determining if there is pre-processing to be performed;
        locally performing any pre-processing that it is determined should be performed, wherein the pre-processing is dictated by the user accessible application code;
        invoking the specific method on the object, comprising:
            converting a call stack into a message object utilized to pass data between sinks identified by user accessible application code, wherein the sinks correspond to system-performed functions that are executed on the data in the process of being passed from the generic proxy to the object and are strung together in a chain of sinks; and
            traversing the sinks by the message object, wherein the user accessible application code is utilized to control the traversal of the message object between the sinks, and wherein the traversal of the message object between the sinks circumvents a first sink in preference for a second sink based on the user accessible application code;
        receiving a first result from the object in response to the method being invoked on the object;
        processing the first result into a second result; and
        returning the second result to the local calling entity.

2. The system of claim 1, the data store populated with one or more of a method name, at least one input parameter, an input parameter count, at least one type identifier associated with the at least one input parameter, a return parameter count, at least one type identifier associated with returned parameters, method data that defines class/interface, a stack pointer and a heap pointer.

3. The system of claim 1, the data store associated with a message object that can be serialized and passed to a disparate domain.

4. The system of claim 1, the locally performed pre-processing comprises one or more of load-balancing, transaction processing, object migration, object persisting, remote method call monitoring, caching remote and local data, controlling remote method call invocations or optimization of remote call invocation by utilization of one or more neural network paradigms.

5. The system of claim 4, the one or more neural network paradigms comprise at least one of directed search networks, radial basis functions, cerebella model arithmetic computer or function link networks.

6. The system of claim 1, the generic proxy performs proxy post-processing subsequent to receipt of the results from the object.

7. The system of claim 6, proxy post-processing comprises one or more of auditing, transaction processing, object migration, object persisting, remote method call monitoring, caching remote and local data or optimization of remote call invocation by utilization of one or more training systems and methods.

8. In a computing device comprising a processor and memory, a method that facilitates interaction with an object that is stored either locally or remotely, the method comprising:
    creating a generic proxy representing a local image of the object, wherein the generic proxy is created and modified by an application developer through user accessible application code and represents one type of many types of objects and wherein the generic proxy can be configured to represent any of the many types of objects;
    sending a method call to the object from a local calling entity, the method call corresponding to a specific method;
    intercepting the method call on the object by an application code accessible method call intercepting process, wherein the application code accessible method call intercepting process populates a data store with data associated with the received method call, and the data store is accessible by the generic proxy;
    directly routing the method call to the generic proxy instead of the object;
    determining if there is pre-processing to be performed;
    locally performing any pre-processing that it is determined should be performed, wherein the pre-processing is dictated by the user accessible application code;
    invoking the specific method on the object, comprising:
        converting a call stack into a message object utilized to pass data between sinks identified by user accessible application code, wherein the sinks correspond to system-performed functions that are executed on the data in the process of being passed from the generic proxy to the object and are strung together in a chain of sinks; and traversing the sinks by the message object, wherein the user accessible application code is utilized to control the traversal of the message object between the sinks, and wherein the traversal of the message object between the sinks circumvents a first sink in preference for a second sink based on the user accessible application code;

receiving a first result from the object in response to the method being invoked on the object;

processing the first result into a second result; and returning the second result to the local calling entity.

9. The method of claim 8, wherein creating the generic proxy further comprises generating the generic proxy from a base class proxy object.

10. The method of claim 9, further comprising overriding a base class method defined in the base class proxy object, the overridden base class method receives the intercepted method call.

11. The method of claim 8, further comprising populating a data store associated with the method call with information related to the method call.

12. The method of claim 11, the generic proxy accesses the data store associated with the method call to retrieve information related to the method call.

13. The method of claim 8, further comprising:

determining if there is post-processing to be performed;

performing any post-processing that it is determined should be performed by the generic proxy, wherein the post-processing is performed after receiving the first result from the object.

14. The method of claim 8 wherein the object is stored remotely, the generic proxy utilizes one or more training systems and methods to optimize remote call invocation.

15. The method of claim 14, the one or more training systems and methods comprise at least one of back propagation, Bayesian, fuzzy sets or non-linear regression.

16. The method of claim 8, the pre-processing includes dynamically changing invocation of the method to a second object better suited to process the method indicated by the method call.

17. A computer-readable storage medium storing computer executable instructions that when executed by a processor implement the method recited in claim 8.

* * * * *